United States Patent
Manabe et al.

[11] Patent Number: 6,068,896
[45] Date of Patent: May 30, 2000

[54] MOLDED COLORED ARTICLES

[75] Inventors: Harutaka Manabe, Aichi-ken; Daiichiro Kawashima, Ichinomiya; Tomokazu Nishikawa, Aichi-ken; Takahiro Sato, Gifu-ken; Hiroshi Mukai, Hashima; Masao Kobayashi, Ichinomiya, all of Japan

[73] Assignee: Toyoda Gosei Co., Ltd., Nishikasugai-gun, Japan

[21] Appl. No.: 08/808,839

[22] Filed: Feb. 28, 1997

[30] Foreign Application Priority Data

Feb. 29, 1996 [JP] Japan .................................. 8-071419
Aug. 13, 1996 [JP] Japan .................................. 8-232595

[51] Int. Cl.$^7$ .................................................. B60R 13/04
[52] U.S. Cl. .......................... 428/31; 264/328.1; 428/207; 428/908.8
[58] Field of Search .......................... 428/31, 207, 908.8; 264/328.1

[56] References Cited

U.S. PATENT DOCUMENTS

| | | | |
|---|---|---|---|
| 4,778,550 | 10/1988 | Barton et al. | 428/31 |
| 4,810,540 | 3/1989 | Ellison et al. | 428/31 |
| 5,350,608 | 9/1994 | Zoller | 428/31 |

*Primary Examiner*—Henry F. Epstein
*Attorney, Agent, or Firm*—Pillsbury Madison & Sutro LLP

[57] ABSTRACT

An injection molded colored article produced from colored material prepared by blending a coloring pigment with a synthetic resin. The article has the shape of a long main body section and a thin plate section integrally molded along a side edge of the main body section. A back surface of the main body has a curve formed from an inner end thereof. The thin plate section is formed into a tapered shape, having its thickness decreased toward its outer edge. An inclined angle $\theta$ defined between a upper surface and a back surface of said thin plate section, a ratio of distance A between an inner edge of said upper surface and an outer edge of said thin plate section to a distance B between said inner end of said back surface of said thin plate section and said outer edge, A/B, and a thickness C of said main body section are selected to fall within the following ranges;

$5 \leq \theta \leq 45°$;

$0.3 \leq A/B \leq 1$; and $1.5 \leq C \leq 10$ mm.

13 Claims, 5 Drawing Sheets

MOLDED COLORED ARTICLES

BACKGROUND OF THE INVENTION

1. Field of the Invention

The present invention relates to colored molded articles.

2. Description of Related Art

Conventionally, a long molded article, such as a side molding for an automobile or the like, has been produced using colored synthetic resins prepared by blending a coloring pigment with the synthetic resin (hereinafter referred to as "colored resin").

Figure 11:
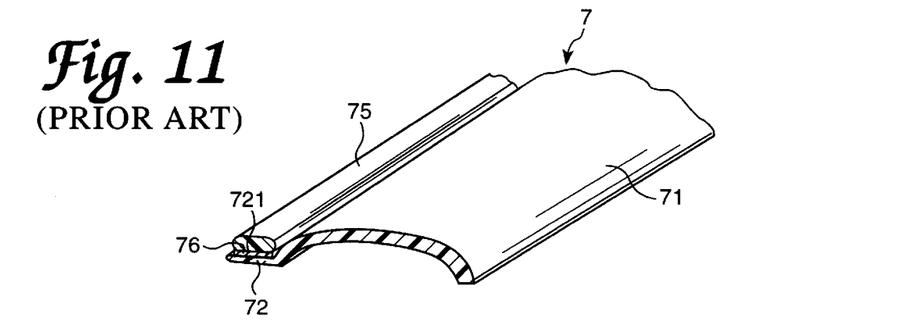
FIG. 11 [Prior Art] is a perspective view of a conventional molded colored article.

As FIG. 11 shows, a colored side molding 7 for an automobile using conventional colored resins is composed of a long main body 71 and a thin plate 72 integrally formed therewith along a side edge of the main body. The thin plate 72 has a thickness less than that of the main body 71 so that a decorative batten 75 is pasted on an upper surface 721 of the thin plate 72. Two-sided tape 76 is used for adhering the batten 75 to the side molding 7.

The colored resin for making the aforementioned conventional side molding 7 contains a glitter material as the coloring pigment containing aluminum powder or the like. The side molding 7 produced by injection molding such a coloring pigment exhibits vivid metallic color over an entire surface thereof requiring no coating, resulting in a highly added value of the desired appearance.

However, the above-obtained side molding 7 using conventional colored resins has the following problems.

Figure 12:
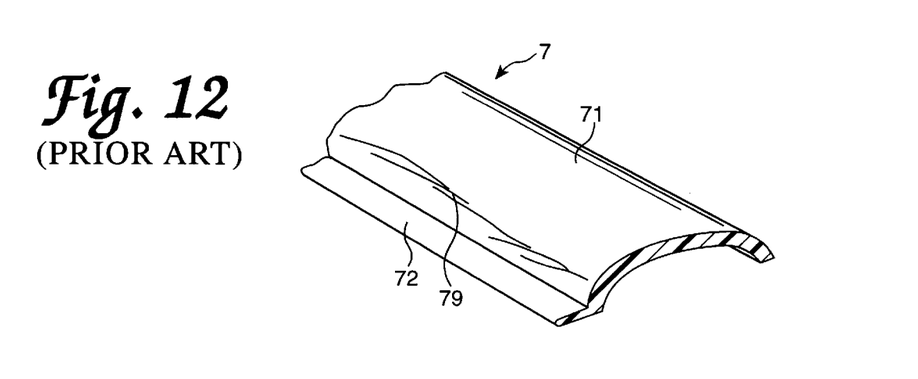
FIG. 12 [Prior Art] is a view showing a flow trace generated on a conventional molded colored article.

As FIG. 12 shows, several undesirable lines 79 are left on the surface of the side molding 7 along the flow direction of the resin around the boundary between the main body 71 and the thin plate 72. Such lines are typically referred to as orientation irregularities, flow traces, or the like.

Figure 13:
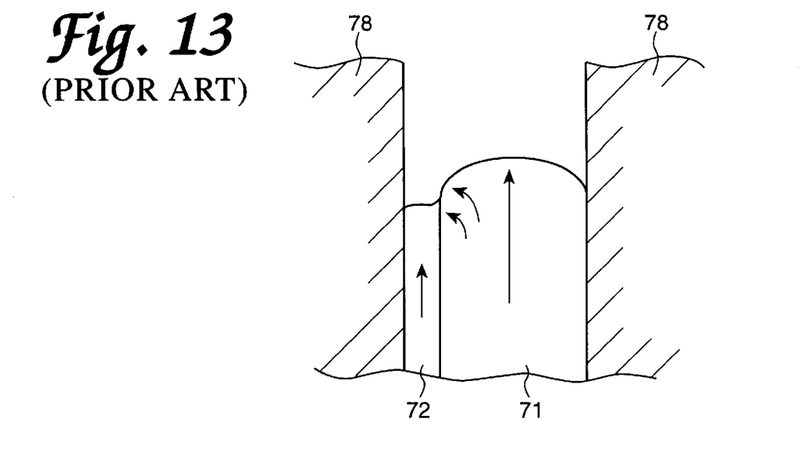
FIG. 13 [Prior Art] is a view showing the flow of resin material passing through a mold cavity during injection molding of a conventional molded colored article.

The cause of the aforementioned orientation irregularities is hereinafter explained. As FIG. 13 shows, within a mold 78 for injection molding, the resin flowing through the mold space for forming the main body 71 (thicker than the thin plate 72) at a center of the mold 78 moves faster than that flowing through the mold space for forming the thin plate 72 near the edge of the mold 78. Therefore, the mold space for forming the thin plate 72 is filled with the colored resin flowing from the main body 71. At this time, a large degree of turbulence may occur in the flow of the colored resin around the boundary between the main body 71 and the thin plate 72. As a result, such turbulence in the resin flow is now believed to cause unevenness on the resultant product surface, thus degrading its appearance.

This type of phenomenon similarly occurs when using a standard colorant as the coloring pigment. The phenomenon is further likely to occur when using glitter materials exhibiting glitter as the coloring pigment, particularly, having a needle-like shape or a flat shape. The orientation irregularity tends to occur easily as the particle size of the coloring pigment becomes smaller and a content thereof becomes larger.

Conventionally, painting has been only a way to provide the beautiful and solid appearance such as deep metallic luster, pearl tone or the like to the surface of the molded resin produced from a thermoplastic resin or the like.

However, the painting method requires complicated processes, such as degreasing and flushing the surface of the molded product, prime coating, intercoating, topcoating, dust removal, drying, baking as well as expensive facilities and paint.

Accompanied with the prolonged cycle time for the above processes, the production cost is further increased.

In order to produce the molded resin exhibiting metallic luster and pearl-like tone at a lower cost, the colored resin prepared by adding the glitter material as an essential additive has been used for molding. The above colored resin is obtained by mixing the glitter material such as metallic fragment (scaly aluminum powder) or mica directly with the resin together with the colorant for producing the metallic luster and the pearl-like tone. The molded product using the aforementioned colored resin is called the molded colored article.

Figure 14:
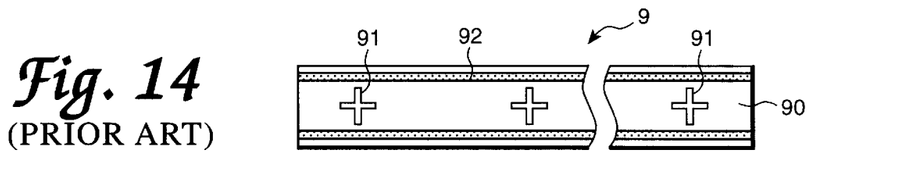
FIG. 14 [Prior Art] shows a back surface of a molded colored article provided with a boss.
Figure 15:
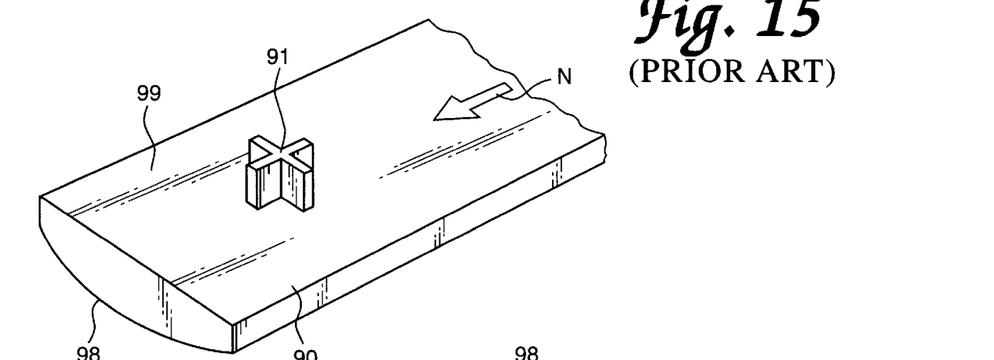
FIG. 15 [Prior Art] is a perspective view of the back surface of a conventional molded colored article provided with a boss.
Figure 16:
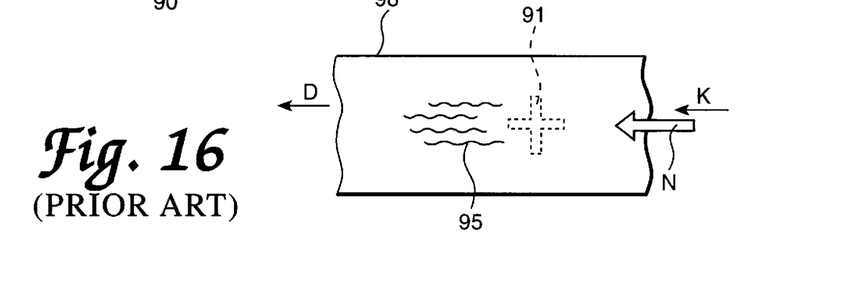
FIG. 16 [Prior Art] is a view showing a flow trace generated on a conventional molded colored article provided with a boss.

Referring to FIGS. 14 to 17, on an upper surface (design surface) 98 of a molded colored article with a boss integrally molded therewith, a flow trace 95 is occasionally generated along with the flow direction of the resin (FIG. 16). FIGS. 14 and 15 show a molded colored article 90 as a long molding having a cross-shaped boss 91 integrally molded therewith on a back surface 99. The boss 91 serves to position the molded colored resin 90 in place to be fixed to the side of the automobile. A reference numeral 92 of FIG. 14 represents an adhesion tape attached to the back surface 99 of the molded colored article 90.

Referring to FIG. 16, the flow trace 95 is occasionally generated downstream of the boss 91 along the resin flow direction "N" of the colored resin flowing from a gate K to the gate D opposite thereto during molding.

Figure 17:
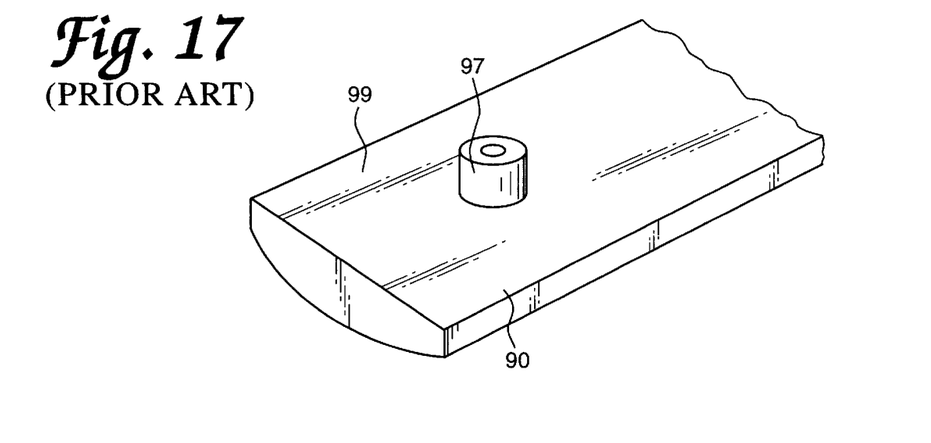
FIG. 17 [Prior Art] is a perspective view of the back surface of a conventional molded colored article provided with a boss.

A similar phenomenon also occurs in case of mounting a column-shaped boss 97 as shown in FIG. 17. The molded colored article having the boss is prepared by injection molding the above-described colored resin into a cavity of the mold and then integrally molding the boss and a main body of the molded colored article simultaneously.

Figure 18:
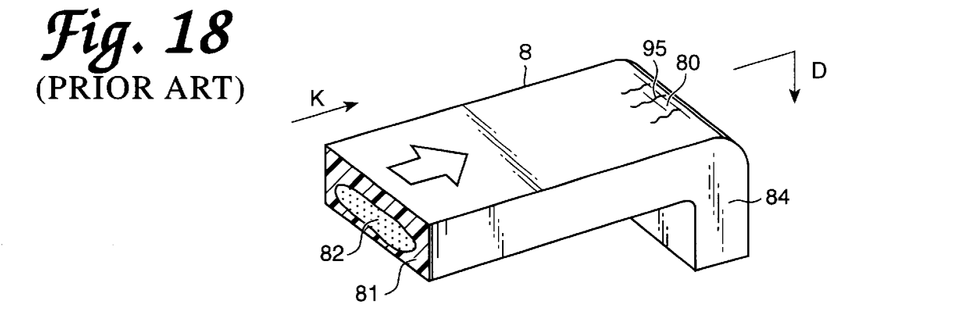
FIG. 18 [Prior Art] is a perspective view of a conventional molded colored article having a bent end.

A flow trace 95 is likewise generated on a molded colored article 8 of a sandwich construction having an outer skin layer formed of the colored resin and a core layer formed by supplying hard material to the inside of the skin layer as shown in FIG. 18.

More specifically, the flow trace 95 is generated around upper surface of a curve part 80 of the molded colored article 8. One end of the molded colored article 8 is bent at a gate D opposite to the gate K from where the resin is supplied for molding to form an L-like shape as a bent end 84.

Figure 19:
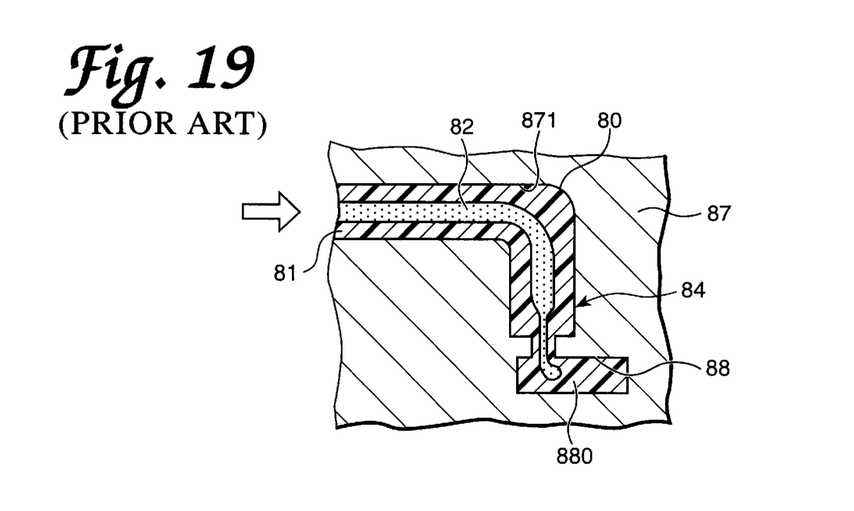
FIG. 19 [Prior Art] is a cross section of a mold where a molded colored article having a bent end is produced in a conventional manner.

The molded colored article 8 of a sandwich construction is molded by injecting the colored resin 81 for a skin layer into a cavity 871 of a mold 87 and then injecting resin for the core layer 82 into the inside of the skin layer. A tab 88 is provided at an end of the mold space for forming the bent end 84 so as to accommodate excessive resin 880 to overflow thereinto as shown in FIG. 19.

The flow trace 95 generated on the upper surface of the respective molded colored articles 9 and 8 shown in FIGS. 16 and 17 is called as "uneven metallic luster", which degrades design quality of the resultant molded colored article. A sink mark is further generated on the part where the aforementioned flow trace is generated.

Various kinds of examinations have been conducted with respect to injection pressure to the colored resin, control of the resin flow rate or the like in order to prevent generation of the above-described flow trace and the sink mark. However, owing to difficulty in establishing the molding conditions, satisfactory results have not been realized yet.

SUMMARY OF THE INVENTION

An objective of the present invention is to provide a molded colored article exhibiting excellent surface qualities which is substantially free of orientation irregularities, flow traces or the like.

This objective and other objectives are surprisingly achieved by a molded colored article comprising a colored resin prepared by blending a coloring pigment with a synthetic resin. The colored resin is molded into a long main body section and a thin plate section integrally formed along a side edge of the main body section, and a back surface of the main body having a curve formed from an inner end thereof. The thin plate section is formed into a tapered shape, having a thickness thereof decreased toward an outer edge. An inclined angle "θ" is defined between a upper surface and a back surface of the thin plate section. A ratio of distance "A" between an inner edge of the upper surface and an outer edge of the thin plate section to a distance "B" between the inner end of the back surface of the thin plate section and the outer edge is defined by "A/B". A thickness of the main body section is defined by "C". The unexpected advantages of the claimed invention can be achieved by having θ, A/B and C fall within the following ranges:

5≦θ≦45°;

0.3≦A/B≦1; and 1.5≦C≦10 mm.

Another objective of the present invention is further achieved by a molded colored article comprising a colored resin prepared by blending mixture of glitter material and colorant with a synthetic resin. The molded colored article comprises a main body section and a boss integrally formed therewith. The boss comprises a base section and leg sections each provided with a side surface of the base section. A hollow section is formed between the base section and the leg section. The hollow section is formed parallel with a direction the colored resin flows during molding.

A further objective of the present invention is achieved by a molded colored article having a sandwich construction. The sandwich construction comprises a skin layer formed from a colored resin containing a mixture of glitter material and colorant, and a core layer comprising a hard material. One end of the molded colored article is bent at a gate opposite to the other gate from where the colored resin flows. A section having a gradually decreased thickness so as to be less than that of a straight part is provided along with a resin flow direction of the colored resin at an area between the straight part and a curve part leading to the bent end.

Other features and advantages of this invention will be apparent form the following description and the accompanying drawings.

DETAILED DESCRIPTION OF THE INVENTION

A first aspect of the present invention is described. The present invention is characterized by a molded colored article comprising a colored material prepared by blending a coloring pigment with a synthetic resin. The molded colored article comprises a long main body section and a thin plate section integrally formed along a side edge of the main body section. A back surface of the main body has a curve formed from an inner end thereof. The thin plate section is formed into a tapered shape, having a thickness thereof decreased toward an outer edge. An inclined angle "θ" is defined between a upper surface and a back surface of the thin plate section. A ratio of distance "A" between an inner edge of the upper surface and an outer edge of the thin plate section to a distance "B" between the inner end of the back surface of the thin plate section and the outer edge is defined by "A/B". A thickness of the main body section is defined by "C". The unexpected advantages of the claimed invention can be achieved by having θ, A/B and C fall within the following ranges;

5≦θ≦45°;

0.3≦A/B≦1; and 1.5≦C≦10 mm.

An important feature of the first aspect of the invention is that the inclined angle θ, the distance ratio A/B, and the thickness C are selected to be within the respective ranges specified above.

The thin plate section has a tapered shape, the thickness of which gradually decreases toward its outer edge opposite to the main body section. Because a decorative batten or the like is pasted on an upper surface of the thin plate section, the thickness of the thin plate section is designed to be smaller than that of the main body section.

To achieve the advantages of the present invention, the inclined angle θ defined by the upper surface and the back surface of the thin plate section should be selected within the following range:

$$5° \leq \theta \leq 45°.$$

If the inclined angle θ is less than 5° and the thickness of the thin plate section is further decreased as a whole, the difference of the thickness between the main body section and the thin plate section becomes so large that the turbulence of the resin flow is likely to occur around the boundary therebetween. Such turbulence can cause undesirable flow traces. If the inclined angle θ exceeds 45°, the batten pasted on the thin plate section is inclined too sharply, and the thickness of the resultant molding becomes too thin, thus deteriorating the moldability.

The ratio of the distance A defined from an inner edge to an outer edge of the upper surface of the thin plate section to the distance B defined from an inner end of the back surface to the aforementioned outer edge falls within the following range;

$$0.3 \leq A/B \leq 1.$$

The inner edge of the upper surface of the thin plate section represents a boundary between the thin plate section and the main body section on the upper surface of the molded colored article. The distance A is specified as a distance measured parallel with the back surface of the thin plate section.

The inner end of the back surface of the thin plate section represents a boundary between the thin plate section and the main body section on the back surface of the molded colored article, from where a curve of the main body is formed.

If the ratio A/B is less than 0.3, the difference of the resin flow rate between the main body section and the thin plate section becomes so large that the surface of the resultant molded colored article can exhibit uneven metallic luster. The thickness difference also becomes so large that a sink mark may be generated. If the ratio A/B exceeds 1, the rigidity may not be sufficient. In particular, as stress is exerted to the inner end in a concentrated manner, the inner end may no longer be able to resist such stress, failing to keep sufficient sectional rigidity.

If the thickness C of the main body section is less than 1.5 mm, the rigidity of the whole molded colored article can be deteriorated. If the thickness C exceeds 10 mm, setting the cooling condition after molding may become difficult. This is because rapid cooling may increase inner stresses and slow cooling may prolong the molding cycle. Furthermore, the thickness difference between the main body section and the thin plate section becomes so large that a sink mark can be generated owing to the resultant shrinkage difference.

The present invention is explained with respect to its advantageous effects.

The molded colored article of the present invention has the inclined angle θ, distance ratio A/B and the thickness C selected to fall within the aforementioned ranges, respectively. When such conditions are satisfied, the obtained surface appearance is substantially free of orientation irregularities compared with that of the prior art.

The colored resin within the mold at injection molding will flow from a main body space to a thin plate space. At this time, specific dimensions of the thin plate shape and the thickness of the main body are set to fall within the above-specified ranges. Therefore, the colored resin flows smoothly when passing around the boundary between the main body section and the thin plate section without causing turbulence, and resulting in undesirable flow traces. As a result, the surface of the obtained molded colored article exhibits a solid impression free of unevenness. Therefore, the present invention provides a molded colored article exhibiting excellent surface quality on which substantially no orientation irregularities or flow traces of the coloring pigment are generated.

A glitter material exhibiting glitter can be used as the coloring pigment. Conventionally as the glitter material provides the metallic luster, the orientation irregularity tends to be noticeable. The present invention, however, prevents such orientation irregularity sufficiently.

The above glitter material may be formed into a needle-like or a flat shape. In the conventional art, the glitter material has been most problematic in causing orientation irregularities. The present invention is able to solve this problem. The present invention, thus, provides an excellent appearance especially when using the glitter material.

Another aspect of the present invention is hereinafter described. The present invention is characterized by a molded colored article using colored resin prepared by blending mixture of glitter material and colorant with a synthetic resin. The molded colored article comprises a main body section and a boss integrally formed therewith. The boss comprises a base section and leg sections each provided with a side surface of the base section. A hollow section is formed between the base section and each leg section. The hollow section is formed parallel with a direction the resin flows during molding of the molded colored article.

An important feature of this invention is that a leg section is provided to a side of the base section of the boss and a hollow section is formed between the base section and the leg section parallel with the resin flow direction.

Examples of suitable glitter material include: slug powder such as scaly metallic powder, polyhedral metallic powder or the like, fine flake of mica, flake of glass, and the like, and any combination thereof.

Examples of suitable coloring pigments include: pigments, dyes or the like can be blended by an appropriate content ratio so as to realize the desired color tone. For example, carbon black, organic green, organic yellow, organic brown can be used as the colorant.

Examples of suitable resins include: polypropylene, ABS, AES, PVC, and the like.

The advantageous effects of the present invention are described. In the present invention, the boss is formed of a base section and leg sections provided with the side surface thereof. A hollow section is formed between the base section and the leg section. The hollow section is formed parallel with the resin flow direction during molding.

As the colored resin is flowing from a gate to the opposite gate during molding, a main body of the molded colored article and the above-described boss are integrally molded.

The boss is molded to have two separate sections, a base section and the leg section. The colored resin in the mold cavity is allowed to flow smoothly into the mold spaces for forming the base section and the leg section. The flow rate "V2" (FIG. 5) of the colored resin passing through the mold space for forming the main body section differs from the flow rate "V1" (FIG. 5) passing through the mold space for forming the boss is decreased.

If the difference between the flow rates is decreased, the colored resin leaves substantially no flow traces downstream of the boss. As the above-described difference of the flow rates is decreased, the occurrence of sink marks can be prevented as well. Thus, the present invention provides the molded colored article that can be easily molded as well as preventing generation of flow trace nor sink mark on its surface.

Figure 4:
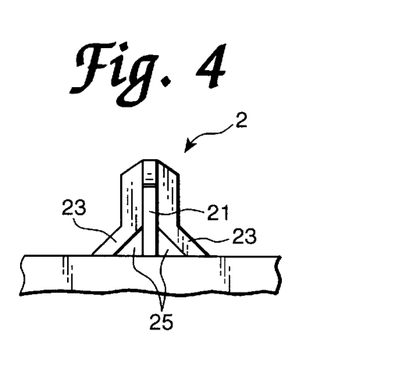
FIG. 4 is a frontal view of a boss according to the present invention.
Figures 5, 6, 7A:
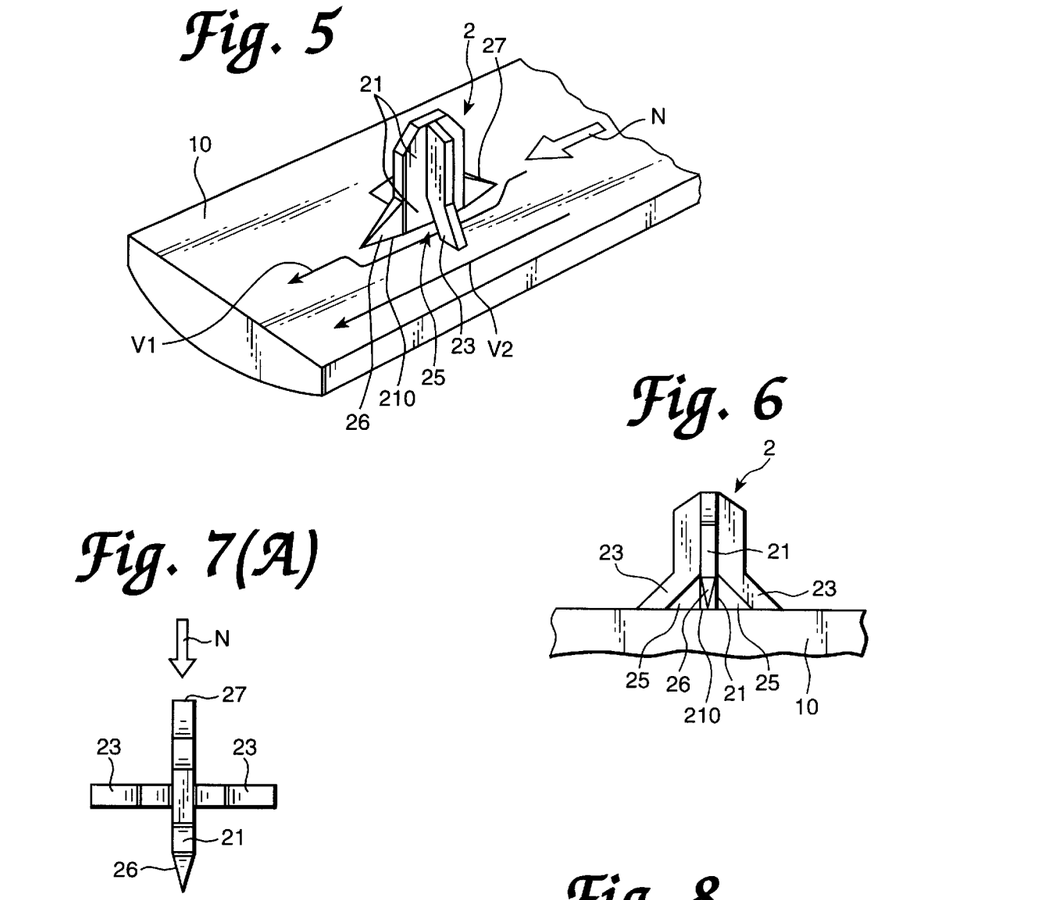
FIG. 5 is a perspective view of a molded colored article according to the present invention.
FIG. 6 is a frontal view of a boss according to the present invention.
FIG. 7(A) is a view of a boss according to the present invention.

It is preferable that a side end of the base section of the boss be formed into a tapered shape at a position at least where it is integrally bonded with the main body downstream of the flow direction of the colored resin (See FIGS. 4, 5 and 7A).

Because the tapered shape of the side end of the base section is formed as above, the flow rate of the colored resin passing through the mold space for forming the boss and its surrounding becomes almost identical to the flow rate of the resin passing through the mold space for forming the main body. Generation of flow traces, thus, is further prevented.

Figure 7B:
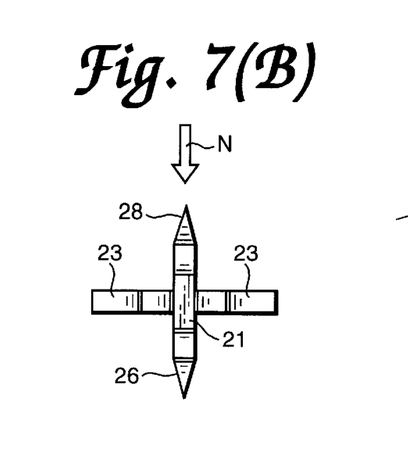
FIG. 7(B) is a view of a boss according to the present invention.

It is preferable that a side end of the base section of the boss be formed into a tapered shape at a position at least where it is integrally bonded with the main body upstream of the flow direction of the colored resin (See FIG. 7B).

Owing to the tapered shape of the side end of the base section formed as above, the flow rate of the colored resin passing through the mold space for forming the boss becomes almost identical to the flow rate of the resin passing through the mold space for forming the main body section. In this manner, generation of flow traces can be further prevented.

Another aspect of the present invention is described. The present invention is characterized by a molded colored article having a sandwich construction comprising a skin layer formed from colored resin containing a mixture of glitter material and colorant, and a core layer comprising a hard material. The core layer can be inserted into the skin layer. One end of the molded colored article is bent at a gate opposite to the other gate from where the colored resin flows. A section having a gradually decreased thickness so as to be less than that of a straight part is provided along a resin flow direction and at an area between the straight part and a curved part leading to the bent end.

The core layer can be formed from a material having a low linear expansion in order to increase the dimensional accuracy of the resultant article. The glitter material and color pigment can optionally only be included in the outer layer.

In the present invention, a section having a gradually decreasing thickness is provided at an area preceding the curve part leading to the bent end. While molding the molded colored article, flow rates of the skin-forming resin and the core-forming resin supplied into the inside of the skin layer are increased at the curve part of the bent end.

More specifically, when producing the molded colored article using the colored resin, the skin-forming resin flows into the mold cavity and then the core-forming resin flows into the resultant skin layer.

In the conventional art where the bent end is formed at the gate far from the opposite gate from where the resin flows, the skin-forming resin is cooled and flows more slowly by the time it reaches the bent end. The flow rate of the skin-forming resin passing on the curved part is further decreased. As a result, the generation of flow traces on the curved part is likely.

On the contrary, in the present invention the flow rate of the skin-forming resin passing on the curve part is almost identical to the flow rate of the resin passing on the straight part, the area other than the curve part. Therefore, generation of the flow trace or sink marks can be substantially prevented.

Figure 8:
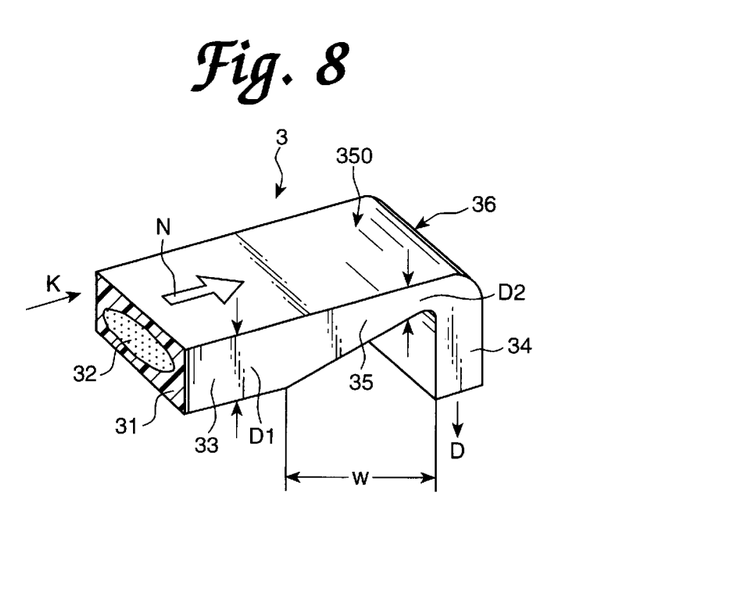
FIG. 8 is a perspective view of a molded colored article according to the present invention.
Figure 9:
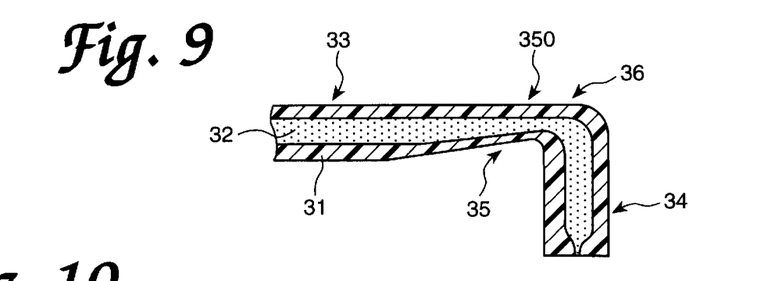
FIG. 9 is a cross section of the molded colored article according to the present invention.

It is preferable that the section having a gradually decreased thickness provided at the area preceding the curve part is shaped so as to cause the back surface of the molded colored article to gradually approach the upper surface thereof (See FIGS. 8 and 9).

It is further preferable to select the section 35 that has a width "w" ranging from about 0.5 cm to 3 cm, the width "w" of the section 35 defined as extending from an inner end of the curve part (back surface of the bent end of the molded colored article) to the straight part. In this manner, generation of flow traces on the bent end can be effectively prevented.

As aforementioned, the present invention provides a molded colored article that can be easily molded as well as generating substantially no flows trace or sink marks on the surface thereof.

Preferably, the minimum thickness of the section having a gradually decreased thickness ranges from about 25% to about 75% of the thickness of the straight part. If it this thickness is less than about 25%, the thickness may be too small to accommodate the core-forming resin within the skin layer, preventing the bent end from having a sandwich construction. If it exceeds about 75%, the advantages of the present invention may not be obtained.

The invention will be further explained by the following non-limiting examples.

EXAMPLE 1

Figure 1:
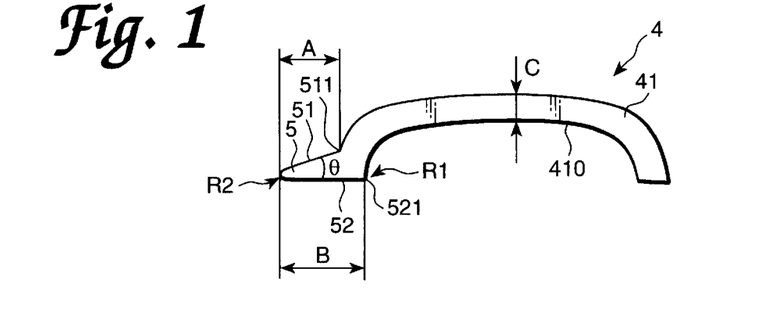
FIG. 1 illustrates a cross section of a molded colored article according to the present invention.
Figure 2:
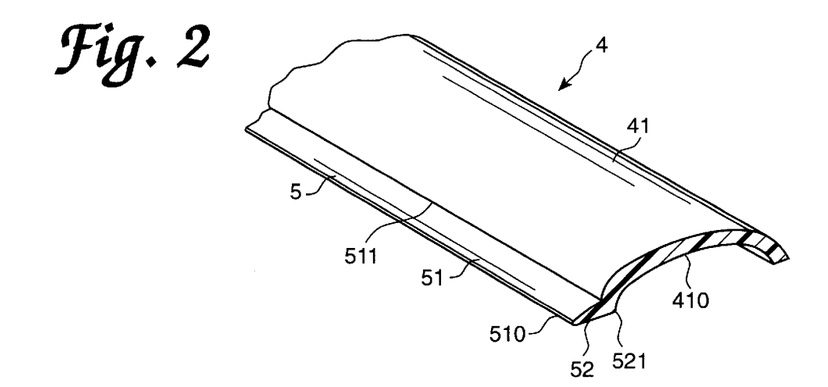
FIG. 2 illustrates a perspective view of a molded colored article according to the present invention.

Referring to FIGS. 1 and 2, a molded colored article of an example of the present invention is described.

A molded colored article 4 shown in FIGS. 1 and 2 as a side molding for an automobile was formed from colored material obtained by blending a coloring pigment with PP resin.

As shown in FIGS. 1 and 2, the molded colored article 4 had a long main body section 41 and a thin plate section 52 that was integrally formed therewith along the side edge thereof. The main body section 41 formed a curve 410 from an inner end 521 of a back surface 52 of the thin plate section 5 on its back surface.

The coloring pigment blended with the colored material was a flat shaped glitter material, exhibiting metallic color tone.

FIG. 1 is a cross section of the molded colored article 4. An inclined angle θ defined between the upper surface 51 and the back surface 52 of the thin plate section 5 was 8°.

A distance "A" between an inner edge 511 of the upper surface 51 of the thin plate section 5 and an outer edge 510 (not measured along the upper surface 51 but measured parallel with the back surface 52.) was 6.5 mm. A distance "B" between the inner end 521 of the back surface 52 of the thin plate section 5 and the outer edge 510 was 8.5 mm. Therefore the ratio A/B was 0.76.

A thickness C of the main body section 41 measured at any point was 3.2 mm within the range from 2.5 to 4.0 mm.

As shown in FIG. 1, in this example, a radius of curvature "R1" of a corner of the inner end 521 of the back surface 52 of the thin plate section 5, i.e., a point from where the curve 410 is formed, was selected to be 1 mm or more. A radius of curvature "R2" of the outer edge 510 of the thin plate section was selected to be 0.3 mm or more.

Function of the present invention is described.

With respect to the cross section of the molded colored article 4, the inclined angle θ, the distance ratio A/B and the thickness C of the main body section 41 are specified in the following ranges, respectively.

$5 \leq \theta \leq 45°$;

$0.3 \leq A/B \leq 1$; and $1.5 \text{ mm} \leq C \leq 10 \text{ mm}$

While producing the molded colored article 4 using injection molding, the colored resin within the mold flows smoothly even when it passes through a space of the boundary between the thin plate section 5 and the main body section 41. Therefore the resultant surface appearance exhibited a solid impression in color with no orientation irregularity even though the flat shaped glitter material that is likely to cause irregularities was used.

Since each radius of curvature R1 and R2 is specified as above, this example further facilitates the resin material to flow through the corner of the inner end 521 and the outer edge 510, preventing generation of the orientation irregularity.

EXAMPLE 2

Figure 3:
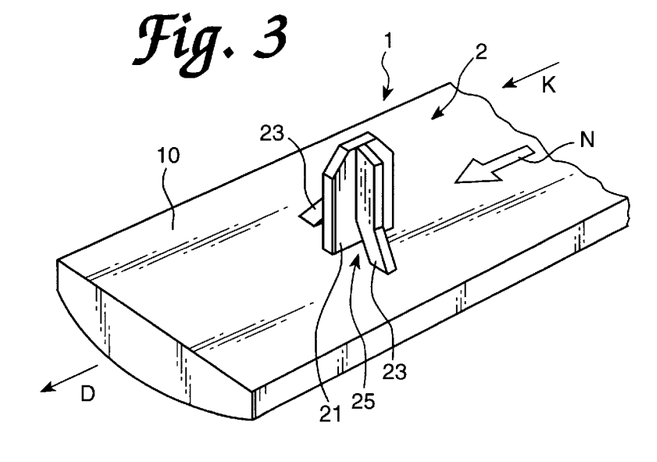
FIG. 3 is a perspective view of a molded colored article according to the present invention.

As FIGS. 3 and 4 show, this example relates to a molded colored article 1 to which a boss 2 was integrally molded.

The molded colored article 1 was a side molding that is to be mounted to a side surface of an automobile. Referring to FIGS. 3 and 4, the molded colored article 1 was produced using a colored resin containing mixture containing a glitter material and colorant. The molded colored article 1 was formed of a main body 10 and the boss 2 integrally molded thereto.

The boss 2 has a base section 21 and leg sections 23, 23 each provided on a side surface thereof. A hollow section 25 was formed between the base section 21 and the leg section 23.

As FIG. 3 shows, the hollow section 25 was formed parallel with the flow direction "N" of the colored resin during production of the molded colored article 1.

In this example, the colored resin was obtained by blending polypropylene resin as the main material with 1.0 wt. % of scaly aluminum powder as the glitter material and 0.05 wt. % of organic green as the colorant. UV absorption inhibitor, dispersant, stabilizer or the like were also added by small amount, respectively.

Effect of the present invention is described.

The boss 2 of this example comprised a base section 21 and the leg sections 23, 23. The hollow section 25 was formed between the base section 21 and the leg section 23. The hollow section 25 was formed parallel with the flow direction "N" of the colored resin during molding.

Flowing from a gate K to the opposite gate D during molding, the colored resin serves to mold the main body 10 and the boss 2 of the molded colored article 1 integrally. Since the boss 2 had separate sections, the base section 21 and the leg section 23, the colored resin in the mold cavity was allowed to flow smoothly into the mold space for forming both the base section and the leg section. As a result, the difference between the flow rate of the colored resin passing through the mold space for forming the main body and the flow rate of the resin passing through the mold space for forming the boss is significantly decreased. In this manner, generation of flow traces downstream of the boss 2 can be substantially prevented. As the difference of the flow rates is decreased, the occurrence of sink marks can also be substantially prevented.

EXAMPLE 3

Referring to FIGS. 5, 6 and 7(A), this example relates to the base section 21 of the boss 2 provided with a tapered side end 26 having its thickness decreased toward the downstream at least at a position 210 where it is integrally bonded with the main body 10.

Another side end 27 of the base section 21 at upstream of the resin flow direction "N" had a uniform thickness.

As aforementioned, the side end 26 of the base section 21 of the boss 2 was formed into a tapered shape at the position where it was integrally bonded with the main body 10. Thus, the colored resin passing through the mold space for forming the boss 2 and its surrounding flows at almost the same rate of the resin passing through the mold space for forming the main body 10. As a result, generation of flow traces can be substantially prevented.

Other functions and advantageous effects were the same as those described in Example 2 above.

As shown in FIG. 7(B), the base section 21 of the boss 2 can be provided with a tapered side end 28 having its thickness decreased toward upstream at least at a position 210 where it is integrally bonded with the main body 10 at a location upstream of the resin flow direction "N" of the colored resin.

Since the mold space upstream of the mold space for forming the boss has a tapered shape in an upstream direction, the flow rate of the colored resin passing through the mold space for forming the boss becomes almost identical to the flow rate of the colored resin passing through the mold space for forming the main body. In this manner, generation of flow traces can be substantially avoided, as well as obtaining the advantageous effects as described above.

EXAMPLE 4

Figure 10:
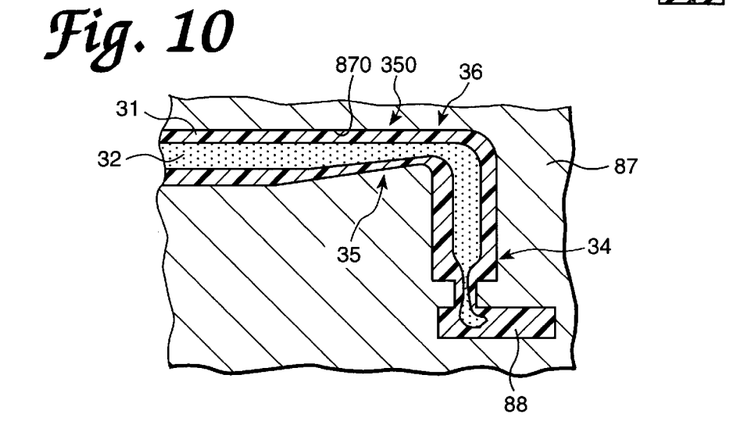
FIG. 10 is a cross section of the molded colored article according to the present invention.

This example relates to a molded colored article 3 of a sandwich construction having a bent end 34 as shown in FIGS. 8, 9 and 10. The molded colored article 3 may be formed into a side molding, side garnish, rocker molding or the like.

Referring to FIGS. 8 and 9, the molded colored article 3 of this example had a sandwich construction comprising a skin layer 31 formed from a colored resin containing a mixture of glitter material and colorant, and a core layer 32 formed by inserting a hard material into the skin layer 31. The molded colored article 3 had a bent end 34 formed at a gate D opposite to the gate K from where the resin flowed.

The molded colored article 3 had a section having a gradually decreased thickness 35 at an area 350 preceding a curve part between a straight part 33 and the bent end 34 along the resin flow direction "N" of the colored resin.

The colored resin for forming the skin layer 31 was prepared by blending 1.2 wt. % of the glitter material identical to the one used in Example 1 and 0.1% of organic brown as the colorant with polypropylene resin as the main material. As the hard material for forming the core layer 32, low linear expansion polypropylene was used.

As FIG. 8 shows, a minimum thickness D2 of the section having a gradually decreased thickness 35 was selected to be 50% of the thickness D1 of the straight part 33. The thickness of the bent end 34 is almost equivalent to that of the straight section 33.

The section having a gradually decreased thickness 35 was provided at an area 350 preceding the curve part 36. The flow rate of the resin for forming the skin layer 31 at a curve part 36 of the bent end 34 was increased to be almost identical to the flow rate of the resin for forming the core 32 supplied to the inside of the skin layer 31.

As FIG. 10 shows, the resin for forming the skin layer 31 flowed into a cavity 870 of a mold 87 and then the resin for forming the core layer 32 was supplied to the inside of the skin layer.

When the bent end 34 was formed at the gate D away from the opposite gate K from where the resin flows, the skin-forming resin was cooled and its flow rate was decreased by the time it reached the bent end. The flow rate is especially decreased at the curve part 36.

Conventionally, flow traces are generated on the curve part 36. However, in the above constructed example, the flow rate of the resin for forming the skin layer 31 passing through the curve part 36 of the bent end 34 was almost equivalent to the flow rate of the resin for forming the straight part 33 and the bent end 34, i.e., the part other than the curve part 36. Therefore, the generation of flow traces or sink marks on the upper surface was substantially avoided.

While the invention has been described with reference to specific examples, it is to be understood that modifications or variations may be easily made by a person of ordinary skill in the art without departing from the spirit and scope of the invention which is defined by the appended claims.

We claim:

1. An injection molded colored article comprising:

a synthetic resin; and a coloring pigment, wherein said article having:

a long main body section;

a thin plate section integrally molded along a side edge of said main body section;

a back surface of said main body having a curve formed from an inner end of the back surface; and said thin plate section having a tapered shape in which the thickness decreases toward an outer edge; and wherein an inclined angle θ defined between a upper surface and a back surface of said thin plate section, a ratio of distance A between an inner edge of said upper surface and an outer edge of said thin plate section to a distance B between said inner end of said back surface of said thin plate section and said outer edge, A/B, and a thickness C of said main body section are selected to fall within the following ranges;

$5 \leq \theta < 45°$;

$0.3 \leq A/B \leq 1$; and $1.5 \leq C \leq 10$ mm.

2. The molded colored article of claim 1, wherein a glitter material exhibiting glitter is used as said coloring pigment.

3. The molded colored article of claim 2, wherein said glitter material has a needle shape or a flat shape.

4. The molded colored article of claim 1, wherein said glitter material is at least one type of material selected from the group consisting of flake metallic powder, fine flake of mica, and flake of glass.

5. An injection molded colored article comprising:

a synthetic resin; and a coloring pigment, wherein said article containing:

a main body section; and a boss integrally formed on said body section, said boss comprising a base section and leg sections;

each leg section being provided with a side surface of said base section and a hollow section is formed between said base section and said leg section; and said hollow section is formed parallel with a flow direction of said colored resin during injection molding said molded colored article.

6. The molded colored article of claim 5, wherein said base section of said boss has a tapered side end provided downstream of said flow direction of said colored resin having its thickness decreasing in said downstream direction at a position at least where said side end is integrally bonded with said main body.

7. The molded colored article of claim 6, wherein said base section of said boss has a tapered side end provided upstream of said flow direction of said colored resin having its thickness decreasing toward said upstream of said flow direction at a position at least where said side end is integrally bonded with said main body.

8. The molded colored article of claim 5, wherein a glitter material is used as said coloring pigment.

9. The molded colored article according to claim 8, wherein said glitter material comprises at one type of element selected from the group consisting of flake metallic powder, polyhedron metallic powder, fine flake of mica, and flake of glass.

10. An injection molded colored article having a sandwich construction comprising:

a core layer comprising a synthetic resin; and a skin layer comprising a colored resin containing mixture of glitter material and color pigment which is adjacent to said core layer, wherein said article having the shape:

one end of said article being bent at a gate opposite to the other gate from where said colored resin flows in an injection mold for molding said article;

a section having a gradually decreased thickness so as to be smaller than that of a straight part is provided in a resin flow direction of said colored resin at an area between said straight part and a curve part leading to said bent end.

11. The molded colored article of a sandwich construction of claim 10, wherein a minimum thickness of said section having a gradually decreased thickness ranges from about 25% to about 75% of a thickness of said straight part.

12. The molded colored article of a sandwich construction of claim 10, wherein said glitter material is at least one type of material selected from the group consisting of flake metallic powder, polyhedron metallic powder, fine flakes of mica, and flakes of glass.

13. An injection molded colored article free from orientation iregularities comprising:

a synthetic resin; and a coloring pigment, wherein said article having a long main body section; a thin plate section integrally molded along a side edge of said main body section; a back surface of said main body having a curve formed from an inner end of the back surface; and said thin plate section having a tapered shape in which the thickness decreases toward an outer edge, and wherein an inclined angle θ defined between a upper surface and a back surface of said thin plate section, a ratio of a distance A between an inner edge of said upper surface and an outer edge of said thin plate section to a distance B between said inner end of said back surface of said thin plate section and said outer edge, A/B, and a thickness C of said main body section are set so that said molded article is free from orientation irregularities of the coloring pigment.

* * * * *